United States Patent [19]

Bennett et al.

[11] 4,010,448
[45] Mar. 1, 1977

[54] INTERRUPT CIRCUITRY FOR MICROPROCESSOR CHIP

[75] Inventors: Thomas H. Bennett; Earl F. Carlow, both of Scottsdale; Anthony E. Kouvoussis, Phoenix, all of Ariz.; Rodney H. Orgill, Norristown, Pa.; Michael F. Wiles, Phoenix, Ariz.

[73] Assignee: Motorola, Inc., Chicago, Ill.

[22] Filed: Oct. 30, 1974

[21] Appl. No.: 519,140

[52] U.S. Cl. .......................................... 340/172.5
[51] Int. Cl.² ....................................... G06F 9/18
[58] Field of Search ............... 340/172.5; 445/1

[56] References Cited

UNITED STATES PATENTS

| | | | |
|---|---|---|---|
| 3,374,466 | 3/1968 | Hanf et al. | 340/172.5 |
| 3,602,889 | 8/1971 | Gayman et al. | 340/172.5 |
| 3,603,936 | 9/1971 | Attwood et al. | 340/172.5 |
| 3,757,306 | 9/1973 | Boone | 340/172.5 |
| 3,757,307 | 9/1973 | Cosserat et al. | 340/172.5 |
| 3,757,308 | 9/1973 | Fosdick | 340/172.5 |
| 3,760,369 | 9/1973 | Kemp | 340/172.5 |
| 3,771,136 | 11/1973 | Heneghan et al. | 340/172.5 |
| 3,828,325 | 8/1974 | Stafford et al. | 340/172.5 |
| 3,832,694 | 8/1974 | Judith | 340/172.5 |
| 3,881,174 | 4/1975 | Barnich | 340/172.5 |
| 3,896,418 | 7/1975 | Brown | 340/172.5 |
| 3,898,623 | 8/1975 | Cormier | 340/172.5 |
| 3,905,025 | 9/1975 | Davis et al. | 340/172.5 |
| 3,909,790 | 9/1975 | Shapiro et al. | 340/172.5 |
| 3,925,766 | 12/1975 | Bardotti et al. | 340/172.5 |
| 3,962,682 | 6/1976 | Bennett | 340/172.5 |

*Primary Examiner*—Gareth D. Shaw
*Assistant Examiner*—Jan E. Rhoads
*Attorney, Agent, or Firm*—Charles R. Hoffman

[57] ABSTRACT

Interrupt circuitry is provided for an MOS integrated circuit microprocessor chip. An input of the microprocessor chip is adapted to having an external interrupt signal applied thereto for interrupting the operation of the microprocessor chip within a digital data processing system. This first input is connected to circuitry which is enabled by a signal from a bit of a condition code register on the microprocessor chip which bit, is set, acts to mask or disenable the interrupt signal, so that the instruction execution operation of the microprocessor chip is not interrupted. A second input of a microprocessor chip is adapted to having a second interrupt signal applied thereto. The second input is connected to other input circuitry which is not enabled by the mask bit of a condition code register. Therefore, the second input acts as a non-maskable interrupt input.

5 Claims, 7 Drawing Figures

INTERRUPT CIRCUITRY FOR MICROPROCESSOR CHIP

RELATED APPLICATIONS

This invention is related to the following patent applictions filed simultaneously herewith and assigned to the assignee of the present application: Ser. No. 519,150, by Bennett, et al, entitled MICROPROCESSOR ARCHITECTURE; Ser. No. 519,138, by Bennett, et al entitled INTERFACE ADAPTOR ARCHITECTURE; Ser. No. 519,149, by Bennett, et al, entitled MIRCOPROCESSOR SYSTEM; Ser. No. 519,131, by Bennett, et al entitled INTERFACE ADAPTOR HAVING CONTROL REGISTER; Ser. No. 519,132, by Bennett, et al entitled MICROPROCESSOR CHIP BUS CONTROL SYSTEM; Ser. No. 519,133, by Bennett, et al, entitled MICROPROCESSOR CHIP REGISTER-BUS STRUCTURE; Ser. No. 519,134, by Bennet, et al entitled MICROPROCESSOR CHIP CIRCUITRY; Ser. No. 519,135, by Bennett, et al entitled MICROPROCESSOR SYSTEM DATA BUS; Ser. No. 519,136, by Bennett, entitled SPLIT LOW ORDER INTERNAL ADDRESS BUS FOR MICROPROCESSOR; Ser. No. 519,137, by Bennett, et al entitled INTERRUPT CIRCUITRY FOR MICROPROCESSOR CHIP; Ser. No. 519,139, by Bennett, et al entitled MULTIPLE INTERRUPT MICROPROCESSOR SYSTEM; Ser. No. 519,142, by Carlow, et al entitled DATA DIRECTION REGISTER FOR INTERFACE ADAPTOR CHIP; Ser. No. 519,143, by Carlow, et al entitled INTERRUPT STATUS REGISTER FOR INTERFACE ADAPTOR CHIP; Ser. No. 519,144, by Wiles entitled NON-MASKABLE INTERRUPT MICROPROCESSOR SYSTEM; Ser. No. 519,145, by Hepworth, et al entitled MASTER-SLAVE CONTROL REGISTER FOR INTERFACE ADAPTOR CHIP; Ser. No. 519,146, by Bennett, et al entitled MICROPROCESSOR SYSTEM INCLUDING PLURALITY OF CONTROLLER CHIPS.

BACKGROUND OF THE INVENTION

A number of integrated circuit microprocessor chips have been implemented using advanced MOS LSI (metal oxide semiconductor large scale integrated circuit) manufacturing processes, including the P-channel and the faster, more sophisticated N-cahnnel technologies. The microprocessor chips are the heart of complete micro-computer systems which additionally typically include a number of power supplies, external RAM (random access memory) devices, ROM (read only memory) devices and a variety of buffer interface and peripheral control devices. A relatively small number of semiconductor chips are required to implement a complete microcomputer system. A simple but complete microcomputer using such microprocessor packages may be implemented on a small printed circuit card, requiring as few as four or five integrated circuit packages. Some control functions may be implemented with even fewer integrated circuit packages. Thereby, the power of computer data processing is made available at very low cost for use in a wide variety of industrial and communications equipment, such as in process and manufacturing control systems, computer peripheral and terminal hardware, parameter-control systems of all types from microcomputers in the automobile to the control systems for traffic and anywhere else that random logic computer control needs optimizing. The savings in design time and cost for the microcomputer systems designer is greatly reduced by the availability of such MOS LSI microprocessor and memory and peripheral units. Printed circuit board layouts are simplified. The complex interconnections required for large numbers of conventional integrated circuits are replaced by ROMs. The only interconnect wiring on printed circuit cards runs between the various address and data buses and input/output devices. The cost savings are not limited to direct component costs, but extend also to other related system hardware costs. Now families of support circuits coupleable directly to a bidirectional data bus, which characterizes most of the known microprocessor chips, and the new microprocessor units (MPU's) are far more powerful, generally, than the earliest first generation MOS LSI microprocessor chips in that the instruction sets for the newer devices are much larger and more powerful (the most advanced microprocessor chips include about 70 instructions) and the instruction execution times are about an order of magnitude faster. Yet, further improvements in overall system performance may be based on improvements in chip architecture of the microprocessor chips and new systems architectures encompassing the MPU chips and associated peripheral circuit families.

Known microprocessor chips have had an input for receiving an external interrupt signal.

SUMMARY OF THE INVENTION

It is an object of this invention to provide an interrupt system for a microprocessor chip which requires utilization of a minimum number of external leads.

It is another object of the invention to provide an interrupt system which minimizes the amount of interrupt circuitry required on a microprocessor chip.

Briefly described, the invention includes interrupt circuitry for a data processor. The interrupt circuitry acts to interrupt a data processing sequence of the data processor by generating an internal interrupt signal which is coupled to and controls the contents of an instruction register of the data processor so that the loading the next instruction into the instruction register is inhibited and the instruction decoder generates a sequence of control signals to control circuitry of the microprocessor as if an externally loaded wait instruction were being executed. In a preferred embodiment, the data processor is an integrated circuit MOS microprocessor chip. In another preferred embodiment, an interrupt request input of the microprocessor chip is coupled to circuitry which is conditionally inhibited by a interrupt mask bit of a register bit of said microprocessor. The microprocessor also includes a non-maskable interrupt bit coupled to circuitry which is not conditionally enabled by the masked interrupt bit. Circuitry is provided which generates a single internal interrupt signal connected to an instruction register of the microprocessor chip and has as its inputs a first internally generated masked interrupt signal and a second internally generated non-maskable interrupt signal generated, respectively, by the first and second interrupt circuits.

DESCRIPTION OF THE INVENTION

Figure 1:
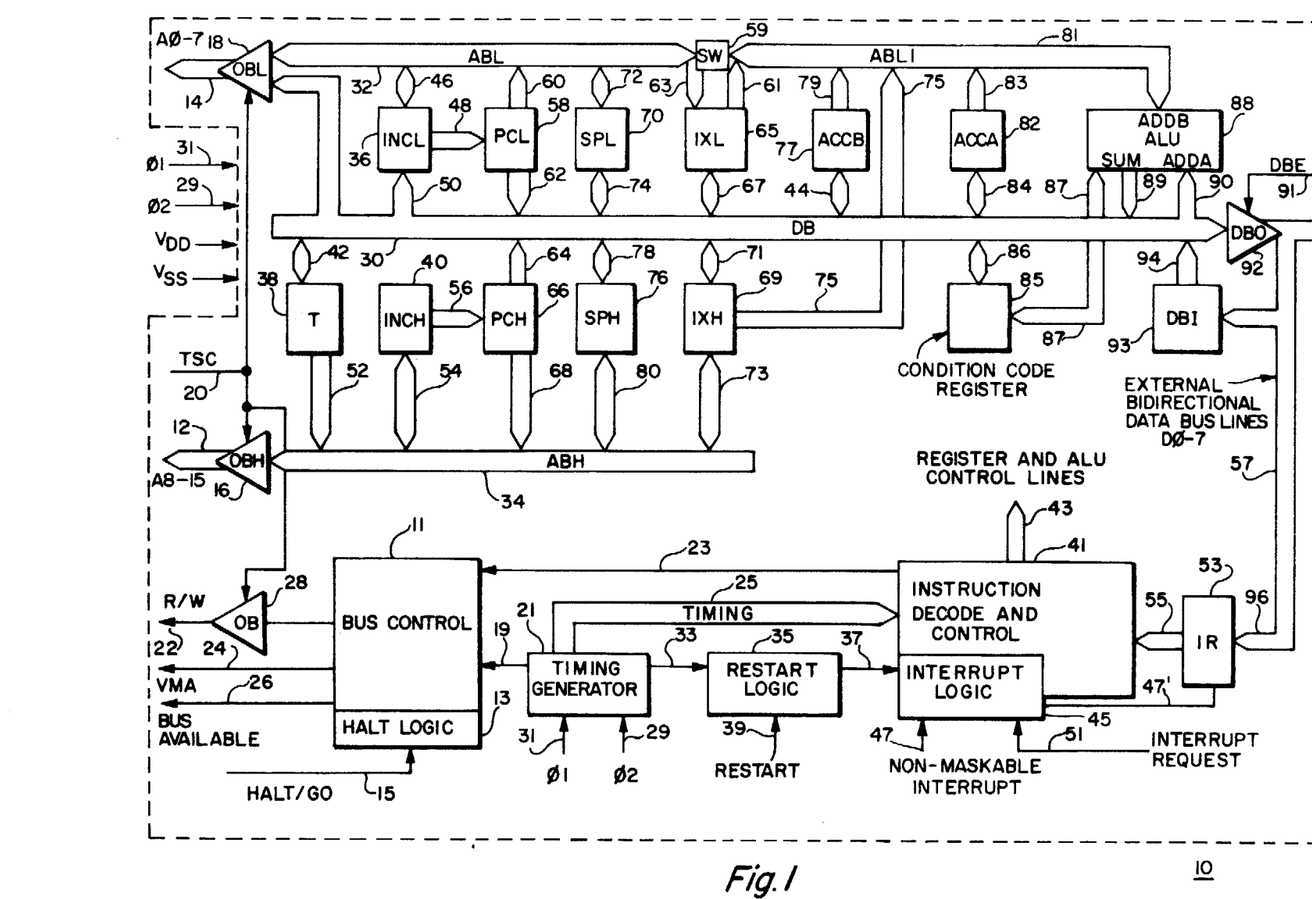
FIG. 1 is a partial block diagram of a preferred embodiment of the invention and includes the internal bus structure and programmable registers for a microprocessor chip.

The block diagram of FIG. 1 represents the architecture of micro-processor chip 10. Micro-processor chip 10 includes a number of control functional blocks including bus control circuitry 11, halt logic 13, timing genrator 21, restart logic 35, instruction decode and control circuit 41, and interrupt logic circuitry 45. The microprocessor architecture depicted in FIG. 1 defines the fundamental relationships between the various counters, registers and arithmetic logic unit (ALU) and the internal address buses and data buses. It should be understood that the term "bust" as used herein means a plurality of separate conductors or a single conductor. The above mentioned control circuitry generates, with appropriate timing, control signals which control the transfer of data between the various registers and buses and the arithmetic logic unit.

Figure 3:
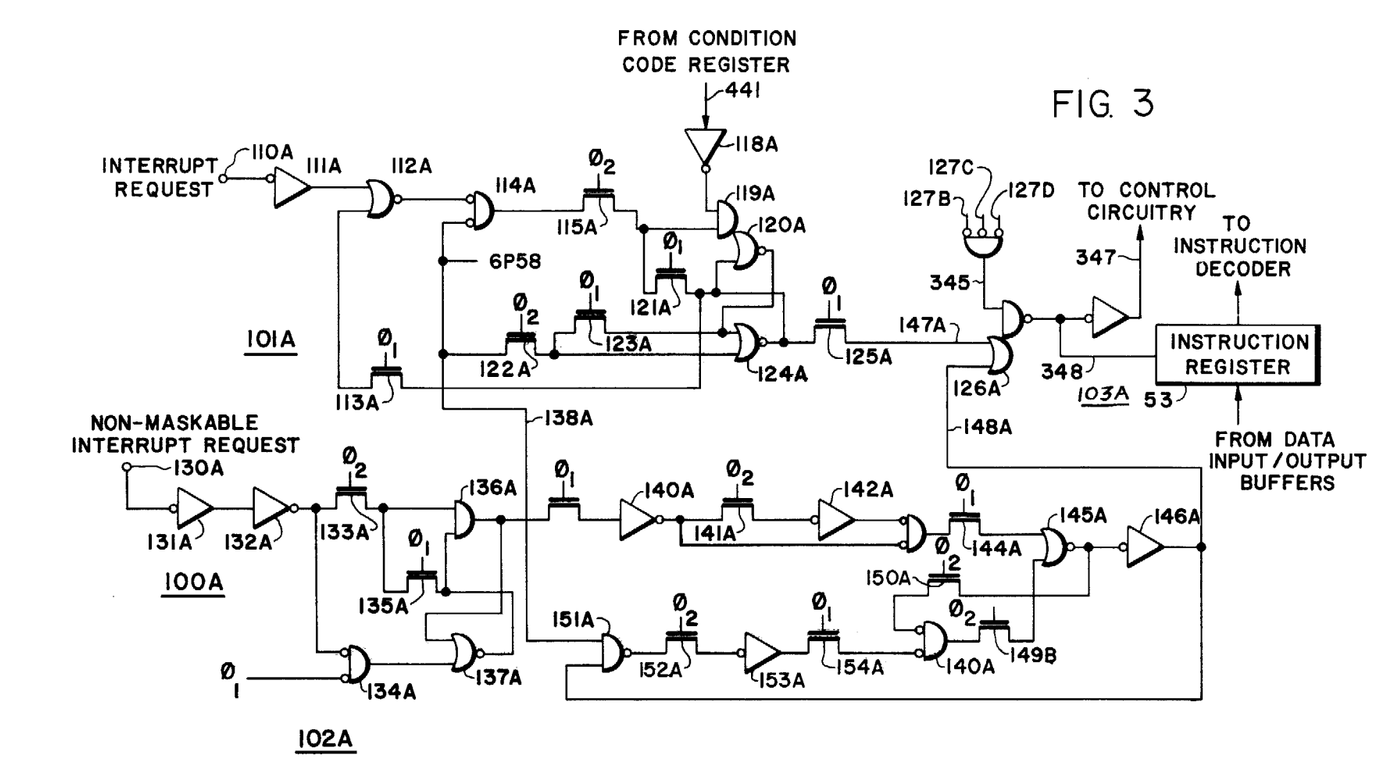
FIG. 3 is a logic diagram of interrupt circuitry according to the invention.
Figure 4:
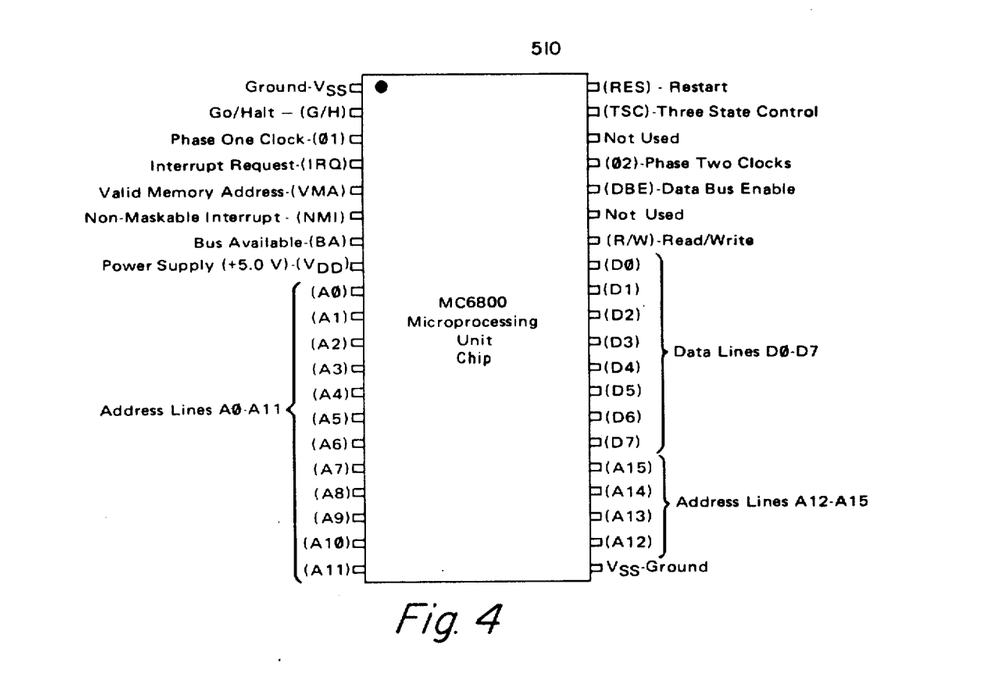
FIG. 4 is a diagram illustrating a dual-in-line semiconductor package for the microprocessor chip of FIGS. 1–3 indicating the input and output signal connections.
Figure 5:
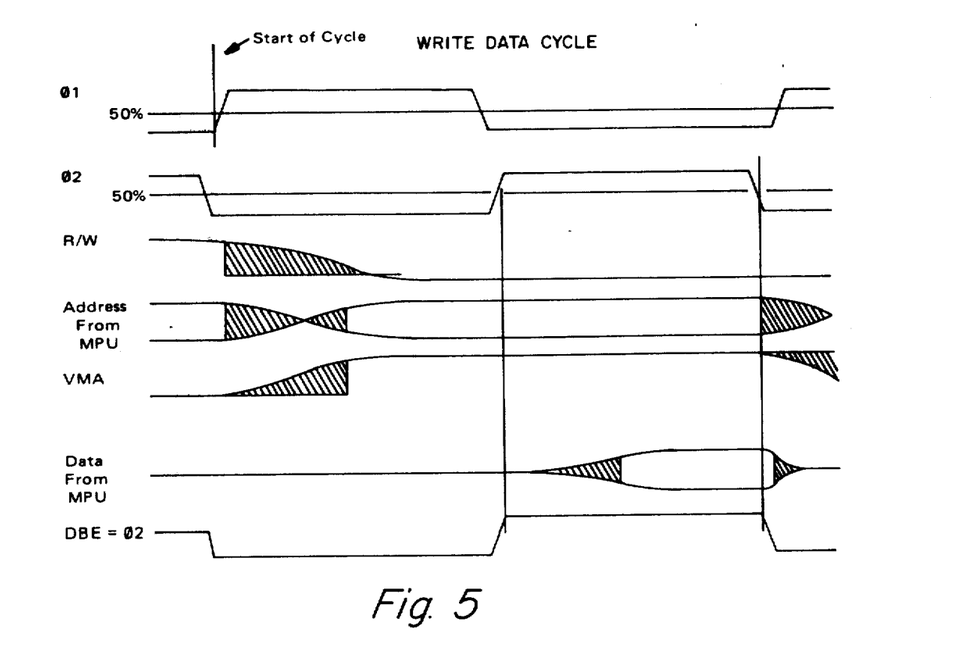
FIG. 5 is a timing diagram descriptive of a write memory cycle of the microprocessor of FIGS. 1–4.

Prior to describing the interconnections of FIG. 1 in detail, it is helpful to describe the various signals which are externally applied to or generated by microprocessor unit (MPU) chip 10 and also to describe the programmable registers and the addressing modes of chip 10. The external signals applied to or generated by microprocessor unit 10 are illustrated in FIG. 4, which indicates the external lead connections of the forty-pin package housing microprocessor chip 10. The dual-in-line forty-pin package is designated by reference numeral 510. The two clocks, 01 and 02 required by the system are non-overlapping clock signals as illustrated in the timing diagrams of FIGS. 5 and 6. For the circuit schematic of FIG. 3 for microprocessor 10, clock signals 01 and 02 operate at the $V_{DD}$ voltage level. The address bus includes 16 address lines AO – A15. The low order address lines A0 – A7 are designated by reference numeral 14 in FIG. 1, are driven by output buffers OBL, and are clearly designated in FIG. 4. The high order address lines A8 – A15 are designated by reference numeral 12 in FIG. 1, are driven by output buffers OBH, and are also clearly designated in FIG. 5. The bidirectional external data bus includes data lines D0 – D7 driven by data output buffers OBH and sensed by data input registers DBI, and is used for transferring data to and from external memory and external peripheral devices controlled by the microprocessor chip 10.

The 16 address lines comprising the address bus are used for addressing external memory and peripheral control devices, to be described later. The Go/Halt (G/H) input, when in the high state, causes the machine to fetch the instruction addressed by the incrementer, (indicated by reference numerals 36 and 40 in FIG. 1) or the program counters (indicated in FIG. 1 by reference numerals 58 and 66), and to start execution. When G/H is low, all activity in the machine will be halted. In the halt mode the machine will stop at the end of an instruction, and the bus available signal (BA) will be at a logical 1 level, and the valid memory address signal (VMA) will be at a logical 0 level, and all other three-state lines will be in the three-state mode (this three-state mode is a very high output impedance mode, wherein all driver devices are in an off state), leaving the output electrically floating. See the timing diagram of FIG. 6. The three-state control (TSC) input signal 20 is indicated by reference numeral 20 in FIG. 1 and causes all of the address lines A0 – A15 and the Read/Write (R/W) line to go into the off or high impedance state. The VMA and BA signals 24 and 26 will be forced to a low level. However, the data bus DB 30 is not affected by TSC, but rather by data bus enable signal (DBE) 91. The fact that the address lines A0 – A15 are driven by three-state bus drivers permits the micro-processor unit 10 to be used in direct memory addressing (DMA) applications, as explained hereinafter.

The Read/Write output tells the peripherals and memory devices whether the micro-processor unit is in a Read (high) or Write (low) state. A normal stand-by state of this signal is the Read (high) level. TSC going high causes the R/W buffer into the off (high impedance) state. Also, when the machine is halted, the R/W buffer will be in the off state. The valid memory address (VMA) output indicates to memory and peripheral devices that there is a valid address on the address bus ABL, ABH. In normal system operations, VMA may be ANDed with 02 or an address line to provide enable signals for external memory devices and peripheral interface devices. The data bus enable (DBE) input 91 is a three-state control signal for the microprocessor data bus and enables the data bus drivers DBO when in the high state. When it is desired for another device to control the data bus as in certain direct memory access applications, DBE should be held low. The interrupt request ($\overline{IRQ}$) input 51 requests an interrupt sequence be generated within the microprocessor chip 10. The microprocessor chip waits until it completes the current instruction that is being executed before it recognizes the request. At that time, if the interrupt mask bit in the condition code register is not set the machine will begin an interrupt sequence in which the index register IXL, IXH (65, 59) the program counter (58, 66) the accumulators ACCA, 82, and ACCB, 77, and the condition code register 85 are stored away on an external RAM (random access memory) stack. Next, the microprocessor 10 will respond to the interrupt request by setting the interrupt mask bit high so that no further interrupt cycles may occur. At the end of the cycle, a 16-bit address will be loaded which points to a vectoring address which is located in memory loctions N-6 and N-7. An address loaded at these locations causes the microprocessor 10 to branch to an interrupt routine in external memory.

The bus available (BA) signal 26 is normally in a low state. When activated, it goes to a high state indicating that the microprocessor 10 has stopped and that the address bus is available. This occurs if the Go/Halt line is in the Halt (low) state or the processor is in the WAIT state as a result of the execution of a WAIT instruction. At such time, all three-state output drivers will go to their off state and other outputs to their normal inactive level. The processor is removed from the WAIT state by the occurrance of a maskable or a nonmaskable interrupt signal. The restart (RST) signal is used to start the microprocessor 10 from a power down condition resulting from a power failure or in the initial start up of the microprocessor. If a positive edge is detected on this input the microprocessor will be signaled to begin a restart sequence. This will restart the microprocessor. All the higher address lines are forced high. For the restart operation, the last two (N-1, N) locations in this area will be used to load the program that is addressed by the program counter.

A non-maskable interrupt (NMI) signal requests that a non-maskable-interrupt sequence be generated within the microprocessor. The interrupt mask bit in the condition code register has no effect on NMI. This sequence could be considered to be a high priority interrupt sequence. The index register, the program register, the accumulators, and the condition code register are stored away on the external memory stack. At the end of this cycle, a 16-bit address will be loaded that points to a vectoring address which is located in memory locations N-2 and N-3. An address loaded at these locations causes the microprocessor to branch to a non-maskable interrupt routine in memory.

Accumulator addressing, in which either accumulator A or accumulator B is specified. These are one-byte instructions.

The microprocessor chip 10 has four 16-bit registers and three 8-bit registers available for use by the programmer. The program counter PCL, PCH indicated by reference numerals 58 and 66, respectively, is a two byte register that points to the current program address. Its contents are updated after execution of an instruction. The incrementer INC which includes INCL and INCH, updates the current program address during the execution of a current instruction, by incrementing or decrementing its currents contents, and may load its contents into the program register independently of the address bus, and may function as an auxiliary register or as an up-down counter or incrementer/decrementer of other registers connected to the address bus or data bus. The stack pointer SPL, SPH, reference numerals 70 and 76, is a two-byte register that contains the address of the next available location in an external push-down/pop-up stack.

The index register IXL, IXH, is a two-byte register that is used to store a 16-bit memory address for the indexed mode of memory addressing. The microprocessor unit 10 contains two 8-bit accumulators ACCA and ACCB that are used to hold operands and results from an arithemtic logic unit (ALU). Condition code register 85 indicates the results of an arithmetic logic unit operation, including negative number, (N, O) Z (overflow) V, carry from bit-8 (C), half-carry from bit 3 (H), and the interrupt mask bit (I). These bits of the condition code register are used as testable conditions for the conditional branch instructions. The microprocessor described with reference to FIGS. 1, 2, and 3, has seven address modes that can be used by a programmer, with the addressing mode a function of both the type of instruction and the coding within the instruction. They are as follows:

In accumulator addressing, either accumulator A or accumulator B is specified. These are one-byte instructions. In immediate addressing, the operand is contained in the second and third bytes of the instruction. No further addressing of memory is required. The microprocessor addresses this location when it fetches the immediate instruction for execution. These are two or three-byte instructions. In direct addressing, the address of the operand is contained in the second byte of the instruction. Direct addressing allows the user to directly address the lowest 256 bytes in a machine. That part of the memory should be used for temporary data storage and intermediate results. These are two-byte instructions.

In extended addressing, the address contained in the second byte of the instruction is used as the higher 8-bits of the address of the operand. The third byte of the instruction is used as the lower 8-bits of the address for the operand. This is an absolute address in memory. These are three-byte instructions. In indexed addressing, the address contained in the second byte of the instruction is added to the index register's lowest 8-bits in the microprocessor. The carry is then added to the higher order 8-bits of the index register. This result has been used to address external RAM. The modified address is held in a temporary address register so there is no change to the index register. These are two-byte instructions. In the implied addressing mode the instruction gives the address. These are one-byte instructions. In relative addressing, the address contained in the second byte of the instruction is added to the program counter's lowest 8 bits plus two. The carry or borrow is then added to the high eight bits. This allows the user to address data within a range of $-125$ to $+129$ bytes of the present instruction. These are two-byte instructions.

Returning to the description of FIG. 1, it is seen that the low order output bus 14 (A0 – A7) is driven by eight output bus low buffers 18 (OBL) and high order address bus 12 (A8 – A15) driven by eight output bus high (OBH) buffers 28. OBH buffers 28 and OBL buffers 18 are enabled by Three-State Control (TSC) conductor 20, as is Read/Write output buffer 28, which is connected to and drives R/W (Read/Write) conductor 22. R/W buffer 28 has an input connected to bus control logic circuitry 11. Output bus low buffers 18 are respectively driven by lower order address (ABL) conductors 32 and internal Data Bus (DB) conductors 30.

It will be noted that the pointed ends of the various buses in FIG. 1 indicate the deviations of the data flow.

OBH buffers 16 are driven by address bus high (ABH) conductors 34. Incrementer 36 (INCL) is connected between ABL Bus 32 and Data Bus 30. It should be understood that sections such as 46 and 50 which couple INCL to ABL and DB indicate the data transfer directions possible by means of coupling circuitry understood to be associated with the registers or counters such as INCL. It will be convenient to consider sections 46 and 50 as representing coupling circuitry and the arrow tips as indicating possible directions of data transfers through the specific coupling circuitry. The program counter PC includes program counter low (PCL), designated by reference numeral 58 and program counter high (PCH), indicated by reference numeral 66. PCL, reference numeral 58 is coupled between ABL, reference numeral 32, and DB, reference numeral 30, by coupling circuitry 60 and 62 and is coupled to INCL by coupling circuitry 48. Similarly, PCH is coupled between DB, reference numeral 30, and ABH, reference numeral 34, by coupling circuitry 64 and 68 and is coupled to INCL by coupling circuitry 56.

The program counter PC, including program counter low (PCL), reference numeral 58 and program counter high (PCH), reference numeral 66, is actually a program register. Its contents are updated by INC, which includes INCL, reference numeral 36 and INCH, reference numeral 40, and may be regarded as counter means. Counter means, generally speaking, may be an incrementer or a decrementer, or in the most general sense, an up counter or a down counter.

The stack pointer includes the stack pointer low (SPL) register 70 and stack pointer high (SPH) register 76. SPL is coupled between ABL and DB by coupling circuitry 72 and 74, respectively. SPH is coupled between DB and ABH by coupling circuitry 78 and 80, respectively. The index register includes index register low (IXL) register 65 and index register high (IXH) register 69. (Note that the terms "high" and "low" as used herein refer to registers coupled, respectively, to the high order and low order address buses, A0 – A7 and A8 – A15, respectively. IXH is coupled between DB and ABH by coupling circuits 71 and 73, respectively. IXL is coupled between ABL and DB by coupling circuitry 63 and 67. An additional address bus low ABL1, reference numeral 81, is connected to ABL by switching circuit (SW) 59. IXL is coupled to ABL1 by coupling circuit 61. IXH is coupled to ABL1 by circuitry 75. Accumulator A (ACCB), reference numeral 77, is connected between ABL1 and DB by coupling circuits 79 and 44, respectively. Accumulator A (ACCA), reference numeral 82, is connected between ABL1 and DB by coupling circuits 83 and 84, respectively. Condition code register 85, is connected to DB by coupling circuitry 86 and is connected to arithmetic logic unit (ALU) 88 by coupling circuitry 87. ALU is connted to ABL1 and to DB by coupling circuit 89 and also by coupling circuit 90. External data bus D0 – D7, reference numeral 57, is coupled to internal data bus DB, reference numeral 30, by data output buffers (DBO) 92, which are enabled by DBE (Data Bus Enable) input conductor 91.

Bus control circuitry 11 is conntected to Read/Write output buffer 28 and generates the R/W signal, and also generates the valid memory address (VMA) signal on conductor 24 and the bus available (BA) signal on conductor 26. Bus control circuitry 11 is connected to Halt logic circuitry 13, which is driven by the input Halt/Go signal on conductor 15. Timing generator 21 generates control signals on conductor 19 which control bus control circuitry 11.

Timing generator 21 has clock signals 01, reference numeral 31, and 02, conductor 29, connected thereto. Timing generator 21 also generates timing signals on conductors 25 which are connected to instruction decode and control circuitry 41 and interrupt logic 45 which is also connected to instruction decode and control circuitry 41. Interrupt logic circuitry 45 generates an interrupt response signal on conductor 47'. Instruction register (IR) 53 is coupled between external data bus 57 and instruction decode and control circuitry 41 by coupling circuits 96 and 55, respectively. Instruction decode and control circuitry 41 generates a plurality of control signals on conductors 43 which are understood to be dispersed throughout the registers and buses and arithmetic logic unit circuitry and the various coupling circuits associated therewith to control in proper sequence the necessary data transfers during execution of the various instructions. These connections are shown in FIG. 3, but not in FIG. 1. Temporary register 38, designated also by letter T, is coupled to DB and ABH by coupling circuits 42 and 38, respectively.

The functions of the registers in FIG. 1, each of which is eight bits (i.e., one byte) in length in the presently preferred embodiment of the invention, are as follows. The program counter contains two eight-bit registers PCH and PCL which point to the current program address. The stack pointer includes two eight-bit registers SPH and SPL and points to the stack in memory. The index register contains two registers IXH and IXL which may address any location in the system. Two eight-bit counters which are actually updown counters INCH and INCL are used for incrementing and decrementing the stack pointer, the index register and program counter and itself. INCH and INCL may also be used as a temporary address register. Temporary stroage register T is used to store the higher order address bits. The two accumulators, ACCA and ACCB, are used to hold operands and results from the arithmetic logic unit (ALU) 88. The condition code register 85 is connected to the ALU and indicates k Negative number, Zero, Overflow, Carry from bit seven, Carry from bit three, and Interrupt Mask Flags.

The data buffer input register (DBI) and the 8-bit instruction register (IR) latch up and hold information applied to external data bus 57. The bus switch SW, when activated, connects the buses ABL and ABL1 to each other, and is biderectional and can transmit data in either direction. The data bus output buffer, DBO, the output address high, buffers OBH, and the output address low buffers OBL, contain three-state output buffers, which are known in the art. One type is described in the copending patent application Serial Number 519,150.

Figure 2:
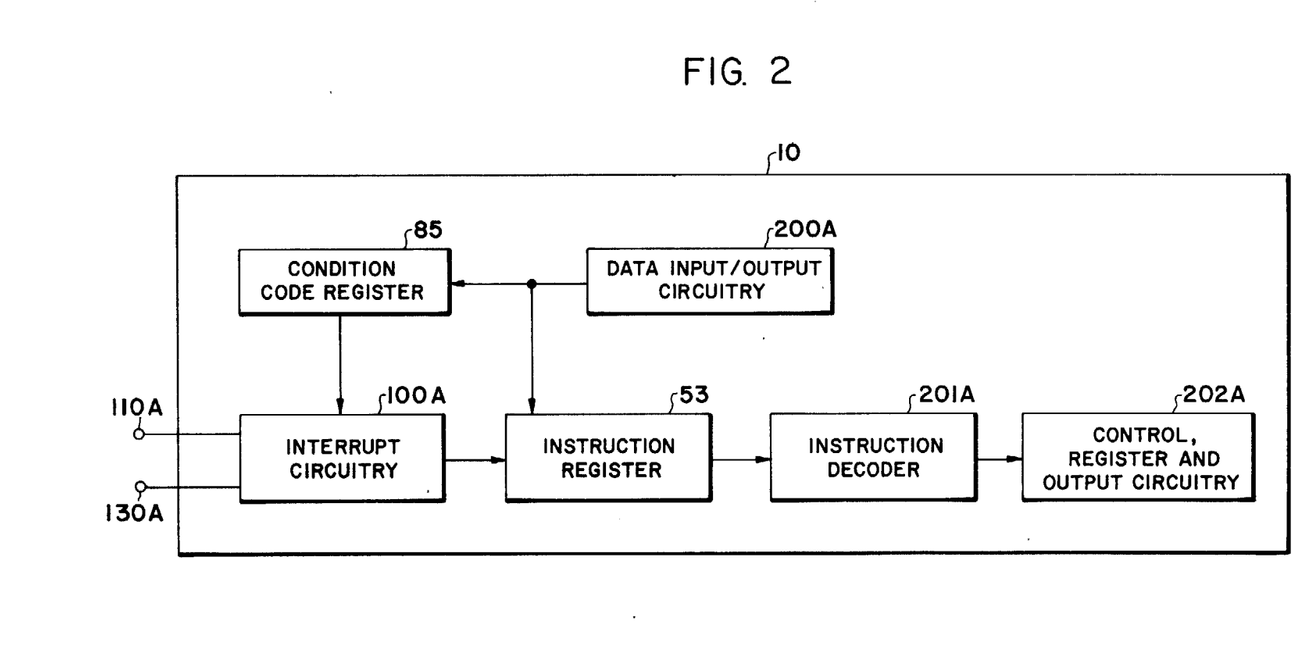
FIG. 2 is a block diagram of a microprocessor chip having interrupt circuitry according to the invention.
Figure 7:
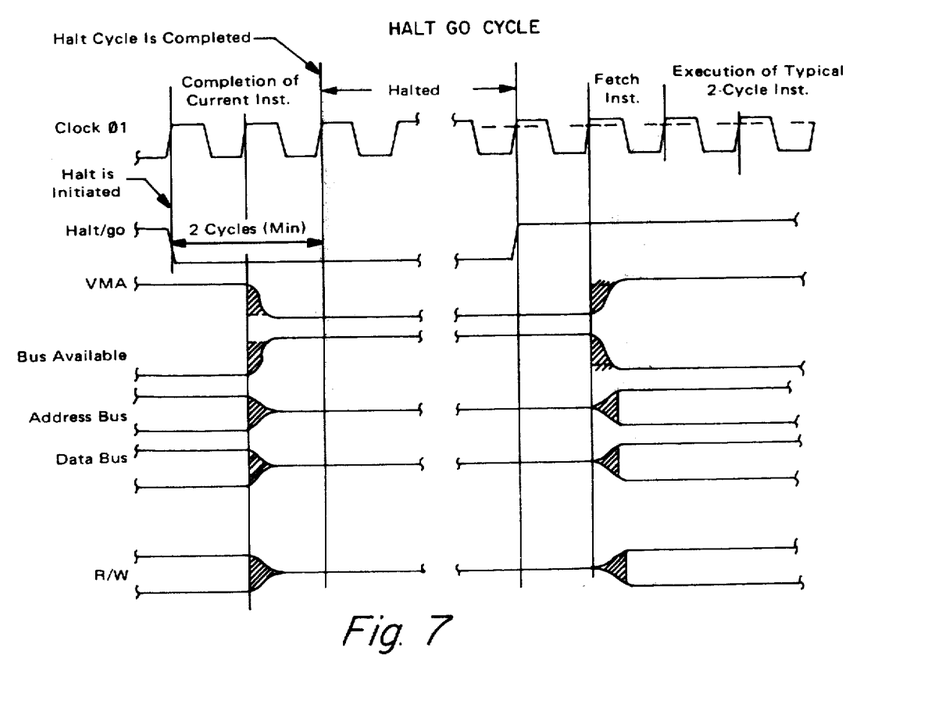
FIG. 7 is a timing diagram descriptive of a Halt cycle for the microprocessor of FIGS. 1–4.

The basic read cycle of the microprocessor of FIGS. 1–3 is shown in FIG. 7. The address output signals A0 – A15 and the valid memory address (VMA) signal are generated as outputs at the beginning of 01 and become stable at times A and B. It should be noted that the letters or alpha numeric designation for certain conductors herein may also be used to designate a signal on that conductor. The Read/Write (R/W) output signal is stable sometime later, designated by reference letter C. Points A, B, and C may be typically 300 nanoseconds later than point D, which is the leading edge of 01. The Memory Enable signal E is equal to the logical product of VMA and 02. Data must be stable at the external Data Bus inputs 57 to the micro-processor 10 at least a minimum time, which may be approximately 100 nanoseconds, before the trailing edge of 02. The data signal is simply the output signal of the accessed external memory.

Figure 6:
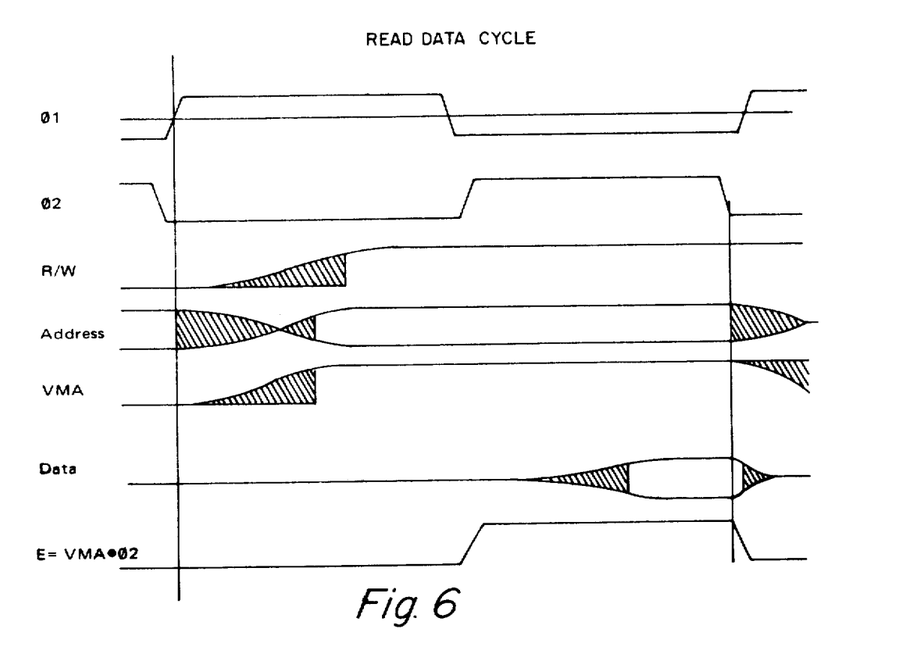
FIG. 6 is a timing diagram descriptive of a Read memory operation of the microprocessor of FIG. 1–4.

The write data sequence for the microprocessor is illustrated in FIG. 6. The address and VMA are generated as outputs at the beginning of 01 and are stable approximately 300 nanoseconds later as in the Read cycle described above. The R/W line is also generated as an output at the beginning of 01 and is stable in approximately 350 nanoseconds. The micro-processor Data Bus Enable (DBE) signal is enabled during 02. Data is generated at the micro-processor chip data output buses approximately 200 nanoseconds after the beginning of 02.

It should be recognized that processors, controllers and computers of the prior art after the advent of large scale integrated circuit microprocessors used to implement computing and processing systems characterticly had a large number of accessable connection points in the system. The large number of connection points accessable allowed use of large numbers of data conductors in the data bus and a large number of address cconductors in the address bus. In general, the number of available pins for connection by data and address buses was not nearly as seriously limited as it is in the case wherein microprocessor is provided on a single integrated circuit chip, in which the number of pins that are available is greatly limited by semiconductor package technology and is presently at an upper limit of about 40 pins for an economical semiconductor package. This puts a great constraint on the number of conductors which can be used for the address bus and the data bus and for the number of pins available for other control signals.

For example, in the microprocessor of FIG. 1 and 8 bit-wide data bus may be utilized. However, in order to have a sufficiently large number of memory locations, a 16 bit-wide address bus is required consisting of two bytes. The split internal data bus arrangement and the associated split registers were invented to allow parallel processing of bytes of data to increase the rate at which certain instructions could be executed.

FIG. 2 is a block diagram of microprocessor chip 10 which includes interrupt circuitry 100A according to a presently preferred embodiment of the invention. Microprocessor chip 10 has input 110A thereof to which a first externally generated interrupt signal may be applied. The first interrupt signal may, for example, be generated by a peripheral interface adaptor as described in the above-mentioned copending patent application, Ser. Num. 519,138. Microprocessor chip 10 has a second input 130A suitable for applying a second externally generated interrupt signal thereto. However, the operation of the interrupt circuitry 100A, which is coupled to inputs 110A and 130A, is such that the internal circuitry coupled to input 110A is enabled by a signal from a "mask interrupt bit" in condition code register 85, which is coupled to interrupt circuitry 100A. Condition code register 85 corresponds to the condition code register 85 of FIG. 1. However, the internal circuitry connected to interrupt input 130A is not enabled by the mask interrupt bit of condition code register 85. Interrupt circuitry 100A generates a signal which is coupled to instruction register 53, which, along with condition code register 85, is coupled to conductors from data input/output circuitry 200A, which includes data input buffer 93, data output buffer 92, and external data lines 57 from FIG. 1. Instruction register 53 has its output coupled to instruction decoder 201A, which generates signals coupled to control, register, and output circuitry 202A. Thus it is seen that the action of interrupt circuitry 100A, according to the invention, is to generate a signal which inhibits loading of a new instruction from data input/output circuitry 200A. therefore, the current instruction is executed, the contents of instruction register 53 are such that instruction decoder 201A operates so as to generate a sequence of signals which correspond to execution of an "internally generated" interrupt signal, which in turn unloads various registers into external memory (not shown) in response to the external interrupt signal applied to either input 100A or input 130A. However, if the condition code register mask bit is set, microprocessor chip 10 does not set into motion the execution of such a interrupt routine. The major advantage to this scheme, according to the invention, is that microprocessor chip 10, as described herein and in the above mentioned copending patent applications, is designed to execute an externally generated interrupt signal, called a wait instruction, for which specialized circuitry is required in Section 202A. According to the invention, some of the same circuitry can be utilized to process an internally generated interrupt execution sequence initiated by an interrupt signal applied to one of inputs 110A or 130A, thereby achieving a substantial savings in circuitry, chip size, and therefore in chip cost.

FIG. 3 is a presently preferred embodiment of interrupt circuitry 100A as shown in the block diagram of FIG. 2. Interrupt circuitry 100A includes three distinct sections. Section 101A is coupled to interrupt request input 110A and processes a signal applied thereto to produce an internal interrupt signal at node 147A. Section 102A is coupled to non-maskable interrupt request 130A and processes a non-maskable interrupt signal applied thereto to generate a second internal interrupt signal at node 148A. Section 103A processes the two signals generated by sections 101A and 102A to generate another internal interrupt signal on conductor 348 which is coupled to instruction register 53 to initiate an internally generated interrupt execution sequence as described above in microprocessor chip 10.

It should be noted that the reference numerals in FIG. 3 which are not followed by a superscript "A" correspond to reference numerals for corresponding conductors in above-mentioned patent copending application Ser. No. 519,150, which includes a substantially complete logic schematic of an entire microprocessor chip.

Section 101A includes inverter 111A having its input connected to interrupt request input 110A and its output connected to an input of NOR gate 112A. NOR gate 112A has its output connected to one input of AND gate 114A which has its output connected to the drain electrode of MOSFET 115A. MOSFET 115A has its gate electrode connected to clock conductor 02 and its source electrode connected to an input of AND gate 119A. The other input of AND gate 119A is connected to the output of inverter 118A, which has its input connected to conductor 441 which is coupled to the mask interrupt bit of condition code register 85. the output of AND gate 119A is connected to an input of NOR gate 120A, which has its output connected to the input of NOR gate 124A, which has its output coupled back to the other input of NOR gate 120A to form a latch. The output of NOR gate 124A is also coupled to the drain of MOSFET 121A which has its gate connected to 01 and its source connected to the other input of AND gate 119A. The output of NOR gate 124A is also connected to the drain of MOSFET 113A, which has its gate connected to 01 and its source connected to the other input of NOR gate 112A. The output of NOR gate 120A is connected to the drain of MOSFET 123A which has its gate connected 01 and its source connected to the other input of NOR gate 124A and also connected to the drain of MOSFET 122A, which has its gate connected to 02 and its source connected to conductor 138A, which has a control signal GP58 applied thereto and is connected also to the other input of NAND gate 114A. The output of NOR gate 124A is connected to MOSFET 125A, which has its gate connected to 01 and its output connected to conductor 147A.

Section 102A includes inverter 131A which has its input connected to non-maskable interrupt request input 130A and its output connected to inverter 132A. Inverter 132A has its output connected to the drain of MOSFET 133A, which has its gate connected to 02 and its source connected to an input of NAND gate 136A. NAND gate 136A has its output connected to an input of NOR gate 137A which has its output connected back to another input of NAND gate 136A to form a latch therewith. The output of NOR gate 137A is connected to the drain of MOSFET 135A, which has its gate connected to 01 and its source connected to the source of MOSFET 133A The output of inverter 132A is connected also to an input of NAND gate 134A, which has another input connected to 01 and an output connected to another input of NOR gate 137A. The output of NAND gate 136A is connected to the drain of MOSFET 139A, which has its gate connected to 01 nd its source connected to the input of inverter 140A. Inverter 140A has its output connected to the drain of MOSFET 141A, which has its gate connected to 02 and its source connected to the input of inverter 142A, which has its output connected to an input of NAND gate 143A. NAND gate 143A has another input connect back to the output of inverter 140A and also has an output connected to the drain of MOSFET 144A, which has its gate connected to 01 and its source connected to an input of NOR gate 145A. NOR gate 145A has its output connected to the drain of MOSFET 150A, which has its gate connected to 02 and its source connected to an input of NAND gate 149A. NAND gate 149A has its output connected to the drain of MOSFET 149B, which has its gate connected to 02 and its source connected to another input of NOR gate 145A. Conductor 138A is connected to an input of NAND gate 151A, which has its output connected to the drain of MOSFET 152A, which has its gate connected to 02 and its source connected to the input of inverter 153A. Inverter 153A has its output connected to the drain of MOSFET 154A, which has its gate connected to 01 and its source connected to another input of NAND gate 149A. The output of NOR gate 145A is connected to the input of inverter 146A, which has its output connected to conductor 148A, which is connected to another input of NAND gate 151A.

Section 103A includes NOR gate 126A, which has another input connected to input 147A and an output connected to an input of NAND gate 126B.

Those skilled in the art will recognize that NOR gate 126A may be part of a combinational gate including NOR gate 126A and NAND gate 126B, and therefore NOR gate 126A may not be distinguishable as a complete, separate gate, but may take the form of three parallel MOSFETs which in unison act as an input of NAND gate 126B. NAND gate 126B has an output 345 connected to another input of NAND gate 126B, and has three conductors, 127B, 127C, and 127D, connected to the input thereof. The output of NAND gate 126B, is connected to conductor 348, which is coupled to and "enables" instruction register 53, as described above. Conductor 348 is connected to the input of inverter 126C which has its output connected to conductor 347, which is connected to control circuitry of microprocessor chip 10.

While the invention has been described with reference to a presently preferred embodiment thereof, those skilled in the art will recognize that variations in arrangment and placement of parts may be made to suit varying requirements within the scope of the invention.

We claim:

1. In a microprocessor, circuitry for effecting execution of an interrupt operation of said microprocessor in response to a interrupt request signal comprising:

data bus means for transferring digital information, said data bus means being capable of being coupled to a memory means having an interrupt routine program stored therein;

register stroage means coupled to said data bus means for temporarily storing digital information in accordance with execution of various instructions by said microprocessor, including an instruction for setting an interrupt mask bit;

an interrupt request conductor for conducting said interrupt request signal;

instruction register means coupled to said data bus means for temporarily storing each instruction as it is received from said data bus means;

instruction decode means coupled to said instruction register means for controlling said register storage means and said data bus means to effect execution of the instruction stored in said instruction register means;

interrupt means coupled to said interrupt request conductor and said instruction register means for inhibiting said temporary storing of the next instruction to be executed in response to said interrupt request signal;

means responsive to said interrupt means for internally generating a fixed code instruction within said instruction register means; and circuit means in said instruction decode means for effecting transferring digital information in said register stroage means to said memory means and causing said microprocessor to branch to said interrupt routine program.

2. Circuitry as recited in claim 1 further including second circuit means coupled to said instruction decode means for generating a fixed address vector which causes said microprocessor to address a fixed location in said memory means corresponding to said fixed address vector and which causes said microprocessor to read stored information from said fixed location, said stroed information being the address of the first instruction of said interrupt routine program.

3. Circuitry as recited in claim 2 wherein said microprocessor further includes address bus means coupled to said register storage means and capable of being coupled to said memory means for addressing said memory means, wherein said fixed address vector is transferred to said memory means via said address bus means in order to address said fixed location.

4. In a microprocessor integrated circuit chip, interrupt circuitry for controlling execution of a interrupt operation of said microprocessor in response to an interrupt request signal, said circuitry comprising:

an interrupt request input;
a first clock conductor;
a second clock conductor;
a first control conductor;
a storage means for storing a mask bit;
a first inverter having an input and an output, said input being coupled to said interrupt request input;
a first NOR gate having first and second inputs and an output, said first input being coupled to said output of said first inverter;
a first MOSFET having a gate, a drain, and a source, said gate being coupled to said first clock conductor and said drain being coupled to said second input of said first NOR gate;
a first NAND gate having first and second inputs and an output, said first input of said first NAND gate being coupled to said output of said first NOR gate, said second input of said first NAND gate being coupled to said first control conductor;

a second MOSFET having a gate, a drain, and a source, said gate of said second MOSFET being connected to said second clock conductor and said drain of said second MOSFET being coupled to said output of said first NAND gate;

a frist AND gate having first and second input and having an output;

a second inverter having an input and an output, said input of said second inverter being connected to said storage means, said first input of said first AND gate being connected to said output of said second inverter, and said second input of said first AND gate being connected to said source of said second MOSFET;

a third MOSFET having a gate, a source, and a drain, said gate of said third MOSFET being connected to said first clock conductor, said drain of said third MOSFET being connected to said second input of said first AND gate;

a sceond NOR gate having first and second inputs and an output, said first input of said second NOR gate being coupled to said output of said first AND gate, said second input of said second NOR gate being connected to said source of said third MOSFET and to said source of said first MOSFET;

a third NOR gate having first and second inputs and an output, said output of said third NOR gate being coupled to said source of said third MOSFET, said first input of said third NOR gate being coupled to said output of said second NOR gate;

a fourth MOSFET having a gate, a source, and a drain;

a fifth MOSFET having a gate, a source, and a drain;

said drain of said fourth MOSFET being connected to said first input of said third NOR gate, said gate of said fourth MOSFET being coupled to said first clock conductor, said second input of said third NOR gate being connected to said source of said fourth MOSFET and to said drain of said fifth MOSFET, said gate of said fifth MOSFET being connected to said second clock conductor, said source of said fifth MOSFET being coupled to said first control conductor;

a sixth MOSFET having gate, a drain, and a source, said drain of said sixth MOSFET being connected to said output of said third NOR gate, said gate of said sixth MOSFET being connected to said first clock conductor.

5. The interrupt circuit as recited in claim 4 further including:

instruction register means for temporarily storing an instruction received by said microprocessor;

circuit means coupled between said instruction register and said source of said sixth MOSFET for inhibiting loading of any other instruction and forcing an internally generated instruction into said instruction register in response to said interrupt request signal, conditionally upon whether said storage means contains said mask bit.

* * * * *